(No Model.) 4 Sheets—Sheet 1.
S. L. WIEGAND.
FRICTION CLUTCH.
No. 430,907. Patented June 24, 1890.
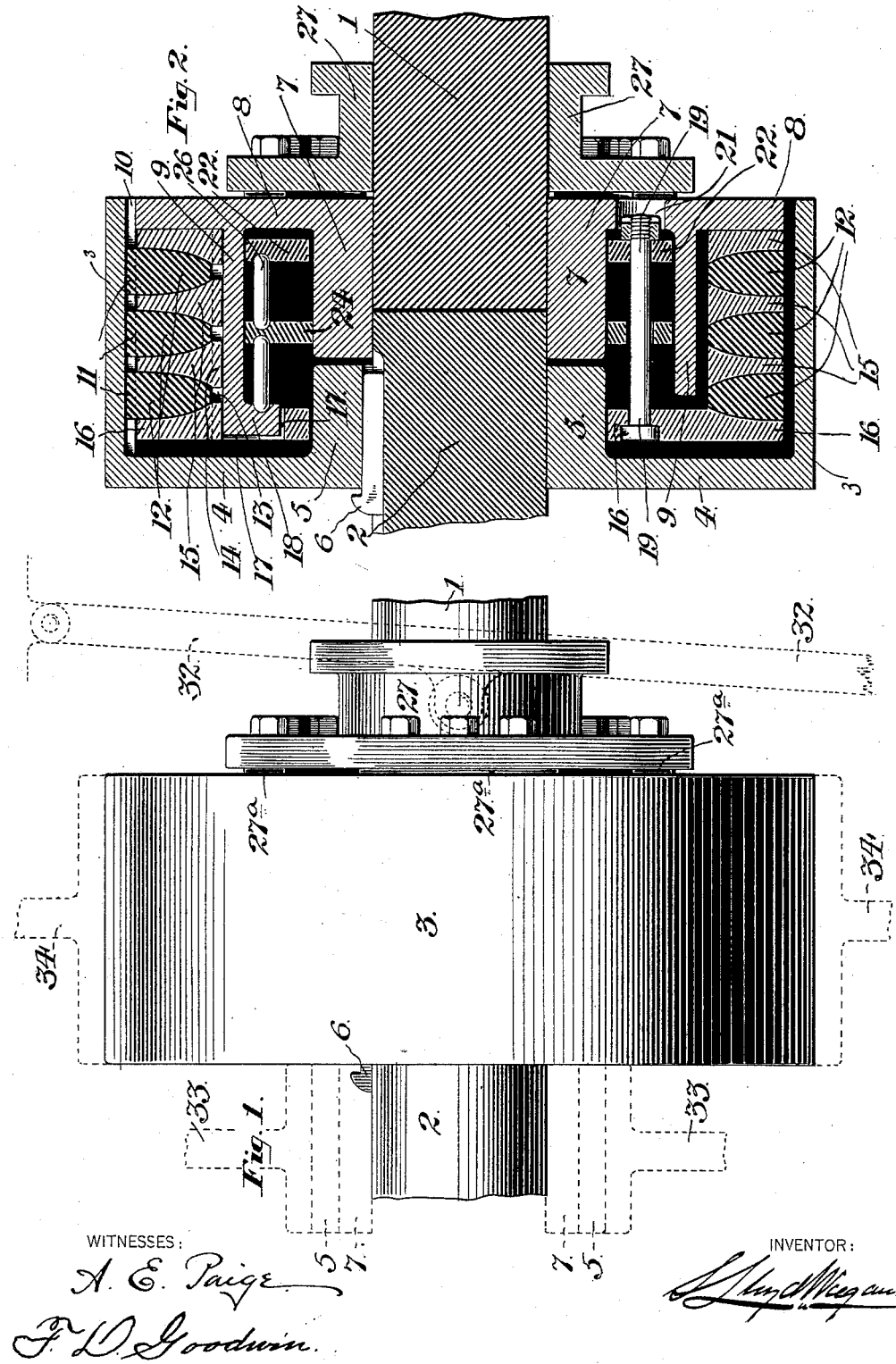
WITNESSES:
A. E. Paige
F. D. Goodwin
INVENTOR:
S. Lloyd Wiegand (No Model.) 4 Sheets—Sheet 2.
S. L. WIEGAND.
FRICTION CLUTCH.
No. 430,907. Patented June 24, 1890.
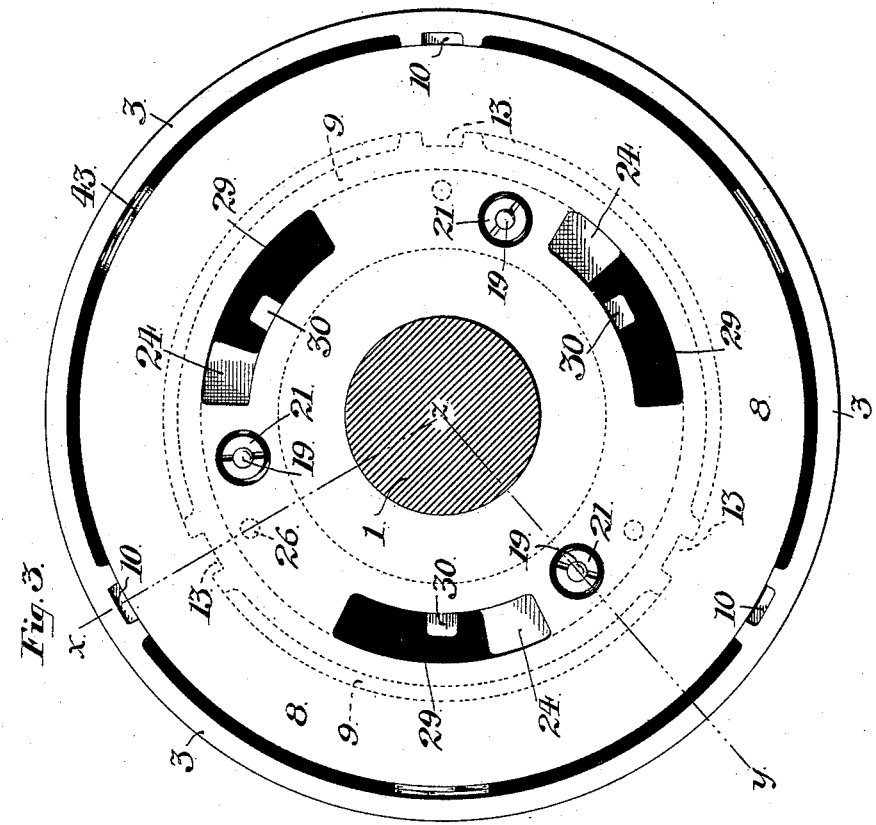
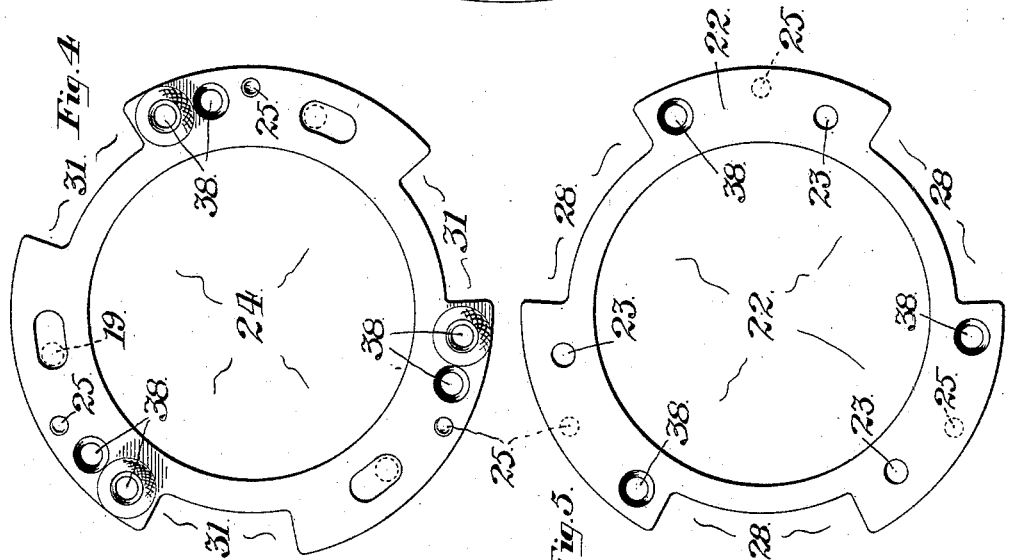
WITNESSES: INVENTOR:

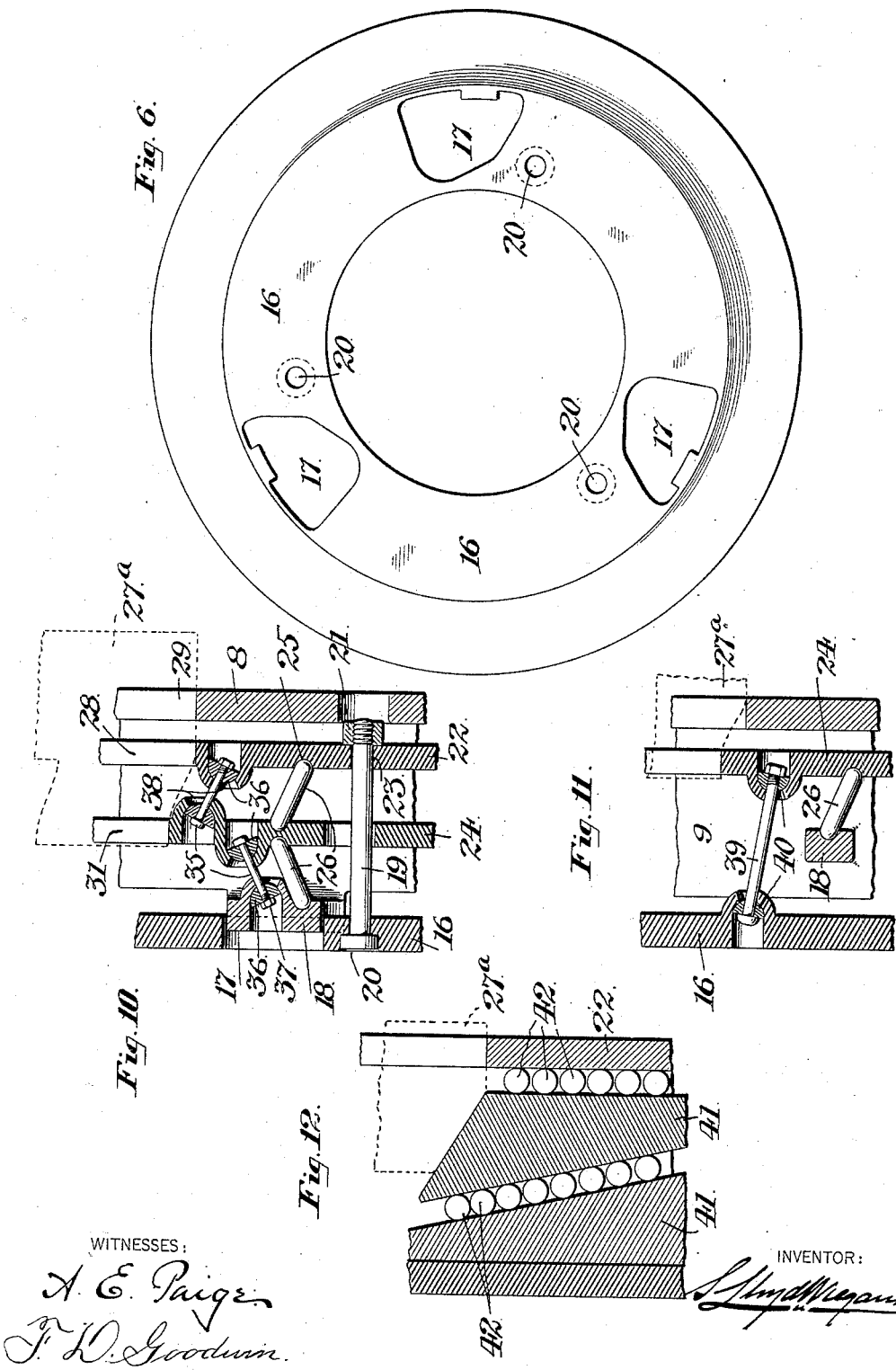

(No Model.) 4 Sheets—Sheet 4.
S. L. WIEGAND.
FRICTION CLUTCH.
No. 430,907. Patented June 24, 1890.
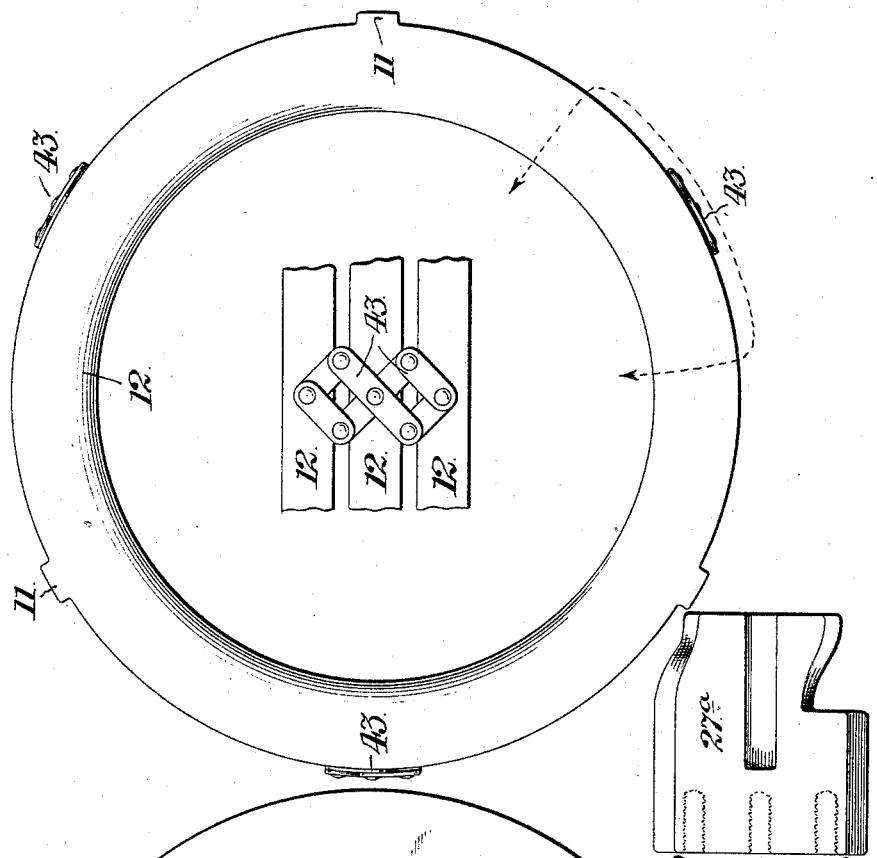
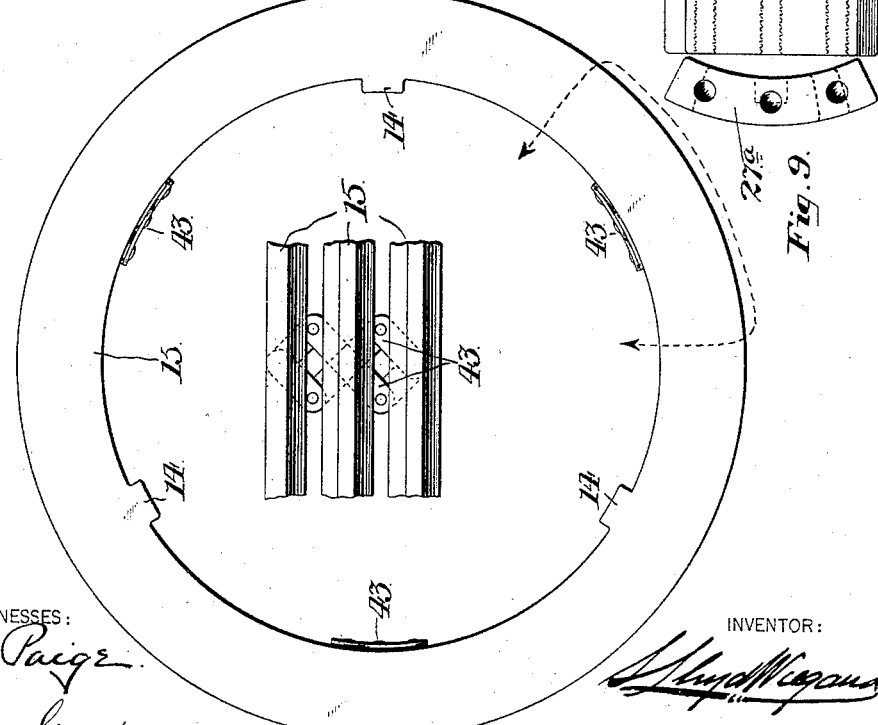
WITNESSES:
A. E. Paige
F. D. Goodwin
INVENTOR:
S. Lloyd Wiegand

UNITED STATES PATENT OFFICE.

S. LLOYD WIEGAND, OF PHILADELPHIA, PENNSYLVANIA.

FRICTION-CLUTCH.

SPECIFICATION forming part of Letters Patent No. 430,907, dated June 24, 1890.

Application filed December 13, 1889. Serial No. 333,669. (No model.)

*To all whom it may concern:*

Be it known that I, S. LLOYD WIEGAND, a citizen of the United States, residing at Philadelphia, in the county of Philadelphia and State of Pennsylvania, have invented certain new and useful Improvements in Friction-Clutches; and I do hereby declare the following to be a sufficiently full, clear, and exact description thereof as to enable others skilled in the art to make and use the said invention.

This invention relates to friction-couplings, and has for its object the avoidance of the difficulty of engaging and disengaging such mechanisms experienced in couplings of usual constructions consequent upon the centrifugal effect or force upon their opening and closing mechanisms when working at high velocities, which in the speeds required for dynamo-electric service has proved such a serious inconvenience in their use as to create a commercial demand for clutches free from this defect.

The invention further embraces the construction and combination of parts by which the full and free disengagement of the coupling, when desired, is rendered more reliably certain, and the apparatus rendered more durable and compact and of greater transmitting capacity than has been heretofore attained with an equal extent of opposed frictional surfaces.

To effect these desiderata, this invention may be briefly stated to consist of a series of frictional zones, within which the mechanism for opening them to and from contact is located, which mechanism produces an enforced severance of the frictional surfaces in disengaging the coupling, and the axes of motions of most of the parts are coincident, or nearly so, in every position of adjustment with that of the revolving shaft, and the weight or mass of parts subject to changes in radius of rotation in different adjustments is so small and near the axis of rotation that there is little or no operative centrifugal effect at any velocity at which they may be required to be used.

The construction and operation of the coupling or clutch is hereinafter fully set forth, and shown in the accompanying drawings, in which—

Figure 1 shows an elevation of the clutch in front view; Fig. 2, sections thereof in the upper and lower halves, respectively, in the planes indicated by the lines $x\ z$ and $y\ z$ in Fig. 3; Fig. 3, an end view thereof; Figs. 4, 5, 6, 7, 8, and 9, views of the detached parts thereof; and Figs. 10, 11, and 12, sectional views of modifications of the engaging and disengaging mechanism.

The same reference-marks indicate like parts in the several figures.

1 represents a revolving shaft from which it is intended to impart rotary motion to the shaft 2. Upon the shaft 2 is fitted a cylindric case 3, closed at one end either entirely by a plate 4 or by arms or spokes uniting it to a hub 5, which is secured to the shaft 2 by a key 6 so as to turn with it. Upon the shaft 1 is fitted a hub 7 so as to turn with it, provided with a flange 8, bearing a hollow cylinder 9 concentric with the axis of the shafts 1 and 2. Inside of the cylinder 3, and parallel with the axis thereof, are formed equidistant key seats or grooves 10, into which fit loosely lugs 11 upon zones or rings 12. (Shown in detail in Fig. 8.) In the outside of the cylinder 9 are formed similar key-seats 13, into which fit loosely lugs 14 upon the zones or rings 15. The sides of the rings 12 and 15 are not flat, but have a curved form in section, preferably of a curve of equal tangents, whereby the difference of angle of the different parts of the opposed surfaces compensates for the differences of velocity and causes equal wear in all parts. Within the cylinder 3 is fitted a plate 16, (shown in detail in Fig. 6,) which plate fits loosely upon but does not turn around the hub 5, and has openings 17 fitting loosely around lugs 18, formed inside of the cylinder 9. Screw-bolts 19, fitted through holes 20 and provided with nuts 21, connect the plate 16 with a plate 22, (shown in Fig. 5,) the bolts 19 passing through the holes 23 in the plate 22. The plate 22 fits loosely around the hub 7 and within the cylinder 9, and is susceptible of motion only in the direction of its axis. A plate 24 (shown in Fig. 4) fits around the hub 7 and within the cylinder 9, so as to turn freely therein. In the lugs 18 and the rings 22 and 24 are hemispherical cups or depressions 25, in which rest the spherical ends of rods 26, forming a series of toggles, which, when straightened by turning the ring 24 in one direction, force the plate 22 away from the lugs 18, and by means of the bolt 19 draw the connected plate 16 against the contiguous ring 11, and, pressing the series of rings 12 and 15 closely against each other, produce such friction as to cause the rings 15 and connected parts to participate in the rotary motion of the rings 12, case 3, and shaft 2.

Rotative or angular adjustment of the plate 24 is effected by a series of helical slides 27$^a$, attached to a spool-shaped sleeve 27, fitted so as to slide upon the shaft 1 in a right line. The helical slides 27$^a$ pass through notches 28, formed in the periphery of the ring 22, and slots 29 in the flange 8, being guided by the splines 30 and fitting at their helical portions in the notches 31 in the plate 24. It is preferable to have the end portions of the slides 27$^a$ parallel with their line of motion and the intermediate portion only helical, so that when the clutch is engaged or disengaged there is no tendency to react on the sleeve 27. The sleeve 27 is moved in the direction of the axis of the shafts 1 and 2 to engage and disengage the coupling by means of the forked lever 32, as shown in Fig. 1.

When the coupling is required to be used on a continuous shaft to connect and disconnect a pulley or other wheel placed thereon, the hub 7 may be extended through the hub 5 and the key 6 omitted, and the pulley or wheel 33 fitted on the extension of the hub 7, as shown in dotted lines in Fig. 1, or a wheel 34 of sufficient size may be fitted upon the cylindric case 3, thus economizing space in the length of the shaft.

In order to enforce the opening or separation of the frictional rings 12 and 15, a series of bolts 35, having spherical heads 36 and nuts 37, arranged in parallel position with the rods 26 and of equal central length therewith, are fitted through holes 38 in the lugs 17, the ring 24, and ring 22, so that the rods 26 are always held in the cavities or seats in the lugs 17 and rings 22 and 24, and motion in both directions (of opening and closing) follows the turning of the ring 22 in both directions as operated by the helical slides 25. The relative arrangement of these parts is shown in Fig. 10; but instead of being drawn in a cylindric curve, as they actually occur, they are depicted as in flat plane, so that their relation to each other may be more readily seen.

The rings 12 and 15 may be made of metal, but work more smoothly if layers of animal skin—such as rawhide—are interposed and saturated with grease. When made of the curved form of cross-section indicated, the wear is practically uniform in all parts of the rings, whereas flat frictional surfaces are found to wear faster on the parts of greatest diameter and the adhesion is then less effective.

In order to compel the separation of the rings 12 and 15 at proper distances when the clutch is opened or released, series of links 43 are pivotally attached to the rings, so that they are pulled apart with uniform interstices by the opening motion of the plate 16 and 22, as controlled by the toggle-levers or an equivalent substitute.

An arrangement of toggle-levers differing in construction from that just described is shown in Fig. 11. In this case the lugs 18 are located near the center of length of the cylinder 9, and short rods 26 are fitted to extend to the ring or plate 24, which in this case is placed near the end of the cylinder 9 in the place of the plate 22, which it supersedes, and link-bolts 39, with hemispherical heads and nuts 40, are fitted through the plates 24 and 16, forming in effect a series of differential toggle-levers. The ring 24, being turned by the helical slides 27$^a$, produces the opening and closing effect described in connection with the preceding figure.

In Fig. 12 is shown another form of mechanism for producing the required multiplication of clamping force within the coupling. In this case, instead of toggle-levers, a series of helical cams 41 are used, bearing upon rollers 42 and turned by helical slides 27$^a$ in the same manner as the rings 24.

All of the forms of construction of this invention, as described, contain the following peculiarities: The mechanism for multiplying the clamping force rotates with the clutch, and but slight force is required to be transmitted through the spool-shaped sleeve 27 in clutching and unclutching, and from the form of the helical slide 27$^a$ there is no reaction upon the sleeve 27 from the toggles, because the slides are at the end of their helical curves parallel to their line of motion. All parts that are distant from the axis during the clutching and unclutching operations have practically constant radii of rotation, and therefore develop no operative centrifugal force at any velocity, while those parts which vary in radius during adjustment are so light and so near to the axis as not to develop any objectionable centrifugal effect, and by having the power-multiplying mechanism inclosed in the central part of the clutch larger and more effective frictional surfaces become practicable in a given diameter and length of clutch.

The annular form and concentric arrangement of parts in this clutch afford a larger clear space for the introduction of shafts of greater dimensions and easy adaptation thereto by merely changing the hubs of the patterns than is practicable with other forms of friction-clutches with clamping mechanism applied to the outer rim.

Having described my invention and the operation thereof, what I claim is—

1. In a friction-clutch, the combination of rings having opposing frictional surfaces connected with the driving and driven member of the clutch and adapted by end pressure to transmit motion to each other with a clamping mechanism inclosed in a central chamber and oscillated therein to open and close the frictional surfaces, substantially as set forth and described.

2. In a friction-clutch, the combination of a clamping mechanism adapted to force into frictional contact rings connected with the driving and driven member of the clutch with rings having frictional surfaces shaped in section as curves of equal tangents, substantially as set forth and described.

3. In a friction-clutch, the combination of a series of rings alternately connected with a driving and a driven member of the clutch with an inclosed chamber arranged to contain a concentrically-moving power-multiplying clamping mechanism, and to receive helically-shaped slides for operating the clamping mechanism, substantially as set forth and described.

4. In a friction-clutch, opposed annular friction-surfaces attached to a driving and driven members of the clutch, in combination with a power-multiplying mechanism and a sleeve actuated by force applied in the direction of the axis of rotation, and vibrating such power-multiplying mechanism upon the axis for enforcing contact of the frictional surfaces, substantially in the manner shown and described.

5. In a friction-clutch, the combination of the case 3 and rings 12 with the cylinder 9, rings 15, lugs 18, rings 22 and 24, rods 26, bolts 19, slides 27$^a$, and sleeve 27, constructed and arranged to operate substantially as and for the purpose set forth.

6. In a friction-clutch having series of rings alternately attached to the driving and driven members thereof, the combination of the series of jointed links 43, pivotally attached to the frictional disks and arranged to enforce the separation of the disks of driving and driven members thereof and equalize the interstices between the disks, substantially as set forth.

7. In a friction-clutch, opposed annular friction-surfaces attached to the driving and driven members of the clutch, in combination with a concentrically-vibrating power-multiplying mechanism having one set of rods for enforcing contact of the surfaces and a distinct set of rods for retracting said surfaces from contact, substantially as shown and described.

S. LLOYD WIEGAND.

Witnesses:
J. DANIEL EBY,
A. V. BUDD.